(12) United States Patent
Ashjaee et al.

(10) Patent No.: US 11,209,550 B2
(45) Date of Patent: Dec. 28, 2021

(54) BAND-SPECTRUM INTERFERENCE VISUALIZER IN A GLOBAL NAVIGATION SATELLITE SYSTEM RECEIVER

(75) Inventors: Javad Ashjaee, Saratoga, CA (US);
Sergey Yudanov, Moscow (RU)

(73) Assignee: Javad GNSS, Inc., San Jose, CA (US)

( * ) Notice: Subject to any disclaimer, the term of this patent is extended or adjusted under 35 U.S.C. 154(b) by 368 days.

(21) Appl. No.: 13/228,348

(22) Filed: Sep. 8, 2011

(65) Prior Publication Data
US 2012/0229333 A1 Sep. 13, 2012

Related U.S. Application Data

(60) Provisional application No. 61/381,774, filed on Sep. 10, 2010, provisional application No. 61/389,651, filed on Oct. 4, 2010.

(51) Int. Cl.
*G01S 19/21* (2010.01)
*G01S 19/35* (2010.01)
(Continued)

(52) U.S. Cl.
CPC .............. *G01S 19/21* (2013.01); *G01S 19/35* (2013.01); *G01S 19/37* (2013.01); *H04B 1/1027* (2013.01); *H04B 17/23* (2015.01); *H04B 17/318* (2015.01)

(58) Field of Classification Search
CPC .......... G01S 19/21; G01S 19/23; G01S 19/37; H04B 15/00; H04B 17/0042; H04B 17/006; H04B 1/1027
(Continued)

(56) References Cited

U.S. PATENT DOCUMENTS

| 5,025,208 A | * | 6/1991 | Danzeisen | ......... G01R 19/0007 324/76.12 |
| 5,345,244 A | | 9/1994 | Gildea et al. | |

(Continued)

FOREIGN PATENT DOCUMENTS

| EP | 1489432 A1 | 12/2004 |
| EP | 2237072 A1 | 10/2010 |

(Continued)

OTHER PUBLICATIONS

Anritsu ("Spectrum Master MS2721B, MS2723B MS2724B" Product Brochure), pp. 1-24. Published May 2007.*
(Continued)

*Primary Examiner* — Gregory C. Issing
(74) *Attorney, Agent, or Firm* — Kilpatrick Townsend & Stockton LLP

(57) ABSTRACT

An apparatus for determining signal strength data within at least one allocated GNSS frequency band is provided. The apparatus includes a GNSS antenna. The GNSS antenna receives signals within the allocated GNSS frequency band. The apparatus further includes receiving circuitry. The receiving circuitry is for demodulating the received signals. The apparatus further includes a processor and memory for storing instructions, executable by the processor. The instructions include instructions for generating signal strength data for the received signals within the GNSS allocated frequency based on the demodulated signals, and for determining a position for a point of interest based upon the demodulated signals. Included in the apparatus is a display screen for displaying a graphical representation of the signal strength data of at least a portion of the at least one GNSS allocated frequency band. The graphical representation identifies interference within at least the portion of the at least one GNSS allocated frequency band.

26 Claims, 9 Drawing Sheets

(51) Int. Cl.
*G01S 19/37* (2010.01)
*H04B 1/10* (2006.01)
*H04B 17/318* (2015.01)
*H04B 17/23* (2015.01)

(58) Field of Classification Search
USPC ..................... 342/357.52, 357.77; 375/148
See application file for complete search history.

(56) References Cited

U.S. PATENT DOCUMENTS

| | | | |
|---|---|---|---|
| 5,603,112 | A | 2/1997 | Gabato et al. |
| 5,721,555 | A * | 2/1998 | Lennen .................. G01S 19/23 342/352 |
| 5,818,389 | A * | 10/1998 | Lazar ............................ 342/383 |
| 6,525,768 | B2 * | 2/2003 | Obradovich .............. 348/231.99 |
| 6,639,541 | B1 * | 10/2003 | Quintana et al. ................ 342/18 |
| 6,754,260 | B1 * | 6/2004 | Itahara et al. ................. 375/224 |
| 7,158,769 | B2 * | 1/2007 | Okanoue ................ H04B 7/005 455/226.1 |
| 7,221,312 | B2 * | 5/2007 | Yee et al. ................. 342/357.59 |
| 7,233,284 | B2 | 6/2007 | Velicer et al. |
| 7,443,154 | B1 | 10/2008 | Merewether et al. |
| 7,459,898 | B1 * | 12/2008 | Woodings .................. 324/76.19 |
| 7,512,492 | B2 * | 3/2009 | Irvin et al. .................... 701/473 |
| RE41,382 | E * | 6/2010 | Yee et al. ................. 342/357.6 |
| 8,006,195 | B1 * | 8/2011 | Woodings et al. ............ 715/777 |
| 8,144,055 | B2 * | 3/2012 | Tysowski et al. ........ 342/357.63 |
| 8,185,134 | B2 * | 5/2012 | Gum et al. ................. 455/456.3 |
| 8,411,164 | B2 * | 4/2013 | Lee et al. ................. 348/231.2 |
| 2002/0186150 | A1 | 12/2002 | Sweetapple |
| 2004/0243307 | A1 | 12/2004 | Geelen |
| 2007/0268174 | A1 * | 11/2007 | Ham et al. ...................... 342/17 |
| 2007/0286269 | A1 | 12/2007 | Hill et al. |
| 2008/0009324 | A1 | 1/2008 | Patel |
| 2009/0189804 | A1 | 7/2009 | Ashjaee et al. |
| 2010/0254437 | A1 * | 10/2010 | Tanaka et al. ................. 375/149 |
| 2011/0058595 | A1 * | 3/2011 | Skeet ............................. 375/232 |
| 2011/0066375 | A1 | 3/2011 | France et al. |
| 2011/0075886 | A1 | 3/2011 | Ashjaee et al. |
| 2012/0050099 | A1 | 3/2012 | Ashjaee et al. |
| 2013/0016006 | A1 * | 1/2013 | Ashjaee .................. G01S 19/21 342/357.25 |
| 2013/0195149 | A1 | 8/2013 | Tanaka et al. |

FOREIGN PATENT DOCUMENTS

| | | | | |
|---|---|---|---|---|
| JP | 2000-138607 | A | | 5/2000 |
| JP | 2003-110509 | | | 4/2003 |
| JP | 2003110509 | | A * | 4/2003 ............ H04B 17/00 |
| JP | 2005-531257 | A | | 10/2005 |
| JP | 2006-518466 | A | | 8/2006 |
| JP | 4060038 | B2 * | | 3/2008 ............... G01S 5/14 |
| JP | 2010-243198 | A | | 10/2010 |
| KR | 20020026052 | | * | 4/2002 ............... G01S 5/00 |
| WO | 2004/004161 | A1 | | 1/2004 |
| WO | 2004/075016 | A2 | | 9/2004 |
| WO | 2009/040500 | A1 | | 4/2009 |

OTHER PUBLICATIONS

Extended European Search Report and Search Opinion received for European Patent Application No. 11180806.9, dated Feb. 3, 2012, 6 pages.

Intention to Grant received for European Patent Application No. 11180806.9, dated May 7, 2013, 6 pages.

Office Action Received for Japanese Patent Application No. 2011-197547, dated May 13, 2015, 10 pages (6 pages of English Translation and 4 pages of Official Copy).

Non-Final Office Action received for U.S. Appl. No. 13/623,802, dated Sep. 2, 2015, 13 pages.

* cited by examiner

BAND-SPECTRUM INTERFERENCE VISUALIZER IN A GLOBAL NAVIGATION SATELLITE SYSTEM RECEIVER

CROSS-REFERENCE TO RELATED APPLICATIONS

This application claims the priority benefit of U.S. provisional application Nos. 61/381,774, filed Sep. 10, 2010, and 61/389,651, filed Oct. 4, 2010, both of which are incorporated herein by reference in their entirety.

FIELD OF THE INVENTION

The present invention relates to visualizing in-band interference by a portable Global Navigation Satellite System (GNSS) receiver, including Global Positioning System (GPS), GLONASS, Galileo, and other satellite navigation and positioning receivers.

BACKGROUND OF THE INVENTION

In most countries, the government regulates radio frequency bands of the electromagnetic spectrum. The government allocates portions of the frequency spectrum to different transmitting systems, such as GNSS systems, television broadcasts, FM and AM radio systems, or radar systems. Thus, to receive the signals from these systems, a specific receiver configured to receive the allocated frequencies is needed. For example, an FM receiver is needed to receive FM radio signals and a TV receiver is needed to receive TV signals. Similarly, a GNSS receiver is needed to receive GNSS signals.

Generally, the first element of a receiving system is a filter to select the signals from the allocated frequency band of interest. For example, when tuning a radio to a radio station, a filter is adjusted to accept signals from that radio frequency band and reject signals from other bands.

However, these filters cannot filter out in-band interference. This type of interference is primarily caused by harmonics, consisting of residual signals from other nearby transmitting systems. The damaging effect of in-band interference depends on the strength of the harmonic relative to the desired signal. For example, if an FM receiver is located far from the transmitting FM station, but very close to another transmitting system, the harmonics of this nearby transmitter may disturb the reception of the desired FM signal from the transmitting FM station.

Similarly, GNSS receivers are also susceptible to in-band interference. GNSS receivers may be even more vulnerable to in-band interference for two reasons. First, GNSS satellites are 20,000 kilometers away, and many transmitting systems that could generate interfering harmonics are much closer to the receivers. Second, the GNSS frequency band is much wider than other allocated bands, making it more likely that a harmonic will fall within the GNSS band. For example, FM radio stations are about 15 KHz wide, while each of the three GPS bands is about 20 MHz wide.

While harmonics within the band of a desired FM radio station may manifest as audible noise to the listener, harmonics within a GNSS band may cause inaccurate position measurements. In particular, a GNSS receiver receiving noisy measurements may cause Real-time Kinematic (RTK) float solutions not to converge to accurate fixed position solutions. Furthermore, a particularly strong harmonic in the vicinity of a GNSS receiver may cause total blockage of one or more of the GNSS bands.

Today, the number of applications utilizing GNSS information is rapidly increasing. As such, identifying in-band interference within GNSS frequency bands is becoming increasingly important. For example, geodesists commonly use GNSS devices to determine the location of a point of interest anywhere on, or in the vicinity of, the Earth. Often, these points of interest are located at remote destinations that are difficult to access. Thus, compact, easy-to-carry positioning devices are desired.

As mentioned above, GNSS receivers work by receiving data from GNSS satellites. To achieve millimeter and centimeter level accuracy, at least two GNSS receivers are needed. One receiver is positioned at a site where the position is known. A second receiver is positioned at a site whose position needs to be determined. The measurement from the first receiver is used to correct GNSS system errors at the second receiver. In post-processed mode, the data from both receivers can be stored and then transferred to a computer for processing. Alternatively, the corrections from the first receiver, the known receiver, may be transmitted in real time (via radio modems, Global System for Mobile Communications (GSM), etc.) to the unknown receiver, and the accurate position of the unknown receiver determined in real time.

A GNSS receiver typically includes a GNSS antenna, a signal processing section, a display and control section, a data communications section (for real-time processing), a battery, and a charger. Additionally, a spectrum analyzer for analyzing in-band interference in the GNSS frequency bands would be a useful tool for a user taking position measurements. However, a conventional spectrum analyzer is another separate component that is often bulky and difficult for a user to carry. Furthermore, including a conventional spectrum analyzer in a GNSS receiver would be bulky and expensive.

Thus, for high-precision applications, the use of multiple units to house the various components required for prior GNSS systems, and the requirement for cables and connectors to couple the units, creates problems regarding portability, reliability, and durability. In addition, the systems are expensive to manufacture and assemble.

BRIEF SUMMARY OF THE DISCLOSURE

Embodiments of the present disclosure are directed to an apparatus for determining signal strength data within at least one allocated GNSS frequency band. The apparatus includes a GNSS antenna. The GNSS antenna receives signals within the allocated GNSS frequency band. The apparatus further includes receiving circuitry. The receiving circuitry is for demodulating the received signals. The apparatus further includes a processor and memory for storing instructions, executable by the processor. The instructions include instructions for determining the signal strength data for the received signals within the GNSS allocated frequency, and for determining a position for a point of interest based upon the demodulated signals. Included in the apparatus is a display screen for displaying a graphical representation of the signal strength data of at least a portion of the at least one GNSS allocated frequency band. The graphical representation identifies interference within at least the portion of the at least one GNSS allocated frequency band.

Figure 1:
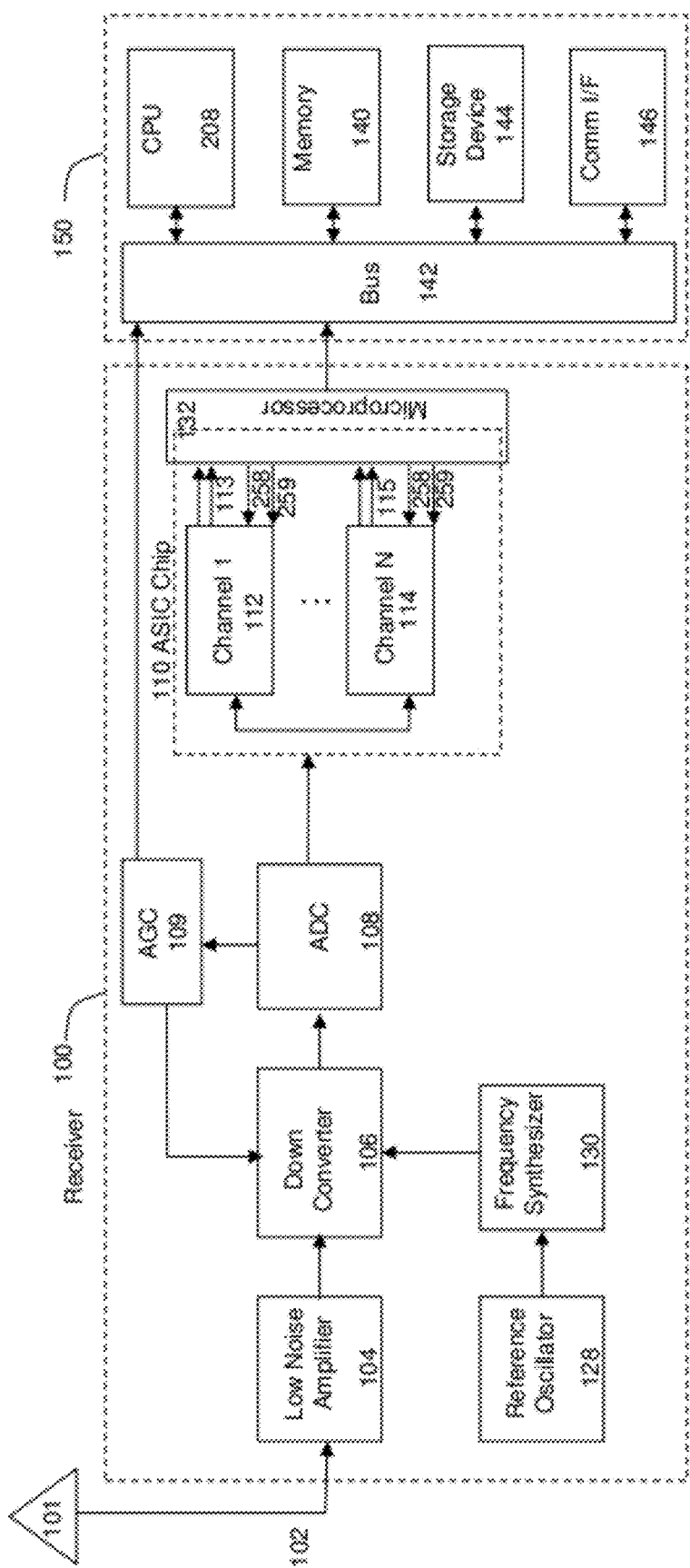
FIG. 1 illustrates a block diagram of a GNSS receiver and CPU according to embodiments of the invention.

In the following description, reference is made to the accompanying drawings which form a part thereof, and which illustrate several embodiments of the present invention. It is understood that other embodiments may be utilized and structural and operational changes may be made without departing from the scope of the present invention. The use of the same reference symbols in different drawings indicates similar or identical items.

DETAILED DESCRIPTION OF THE INVENTION

The following description is presented to enable a person of ordinary skill in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. Some processes can be carried out using processors, receiving circuitry, or other digital circuitry under the control of software, firmware, or hard-wired logic. For example, receiving circuitry may include hardware, software, firmware, or any combination thereof to perform the functions of demodulation of received signals from a GNSS antenna and providing inphase I and quadriphase Q of received signals as would be recognized by one skilled in the art. (The term "logic" herein refers to fixed hardware, programmable logic or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Embodiments of the invention relate to operatively coupling a GNSS antenna, a GNSS receiver, a processor for executing spectrum analysis instructions encoded in memory, and a display. The GNSS antenna, GNSS receiver, processor, display, and memory may be included in a single housing. In some embodiments of the invention, the GNSS antenna, GNSS receiver, processor, display, and memory are mounted in a single housing as a handheld GNSS device. The spectrum analysis instructions cause a processor to calculate the received energy step-wise in an allocated frequency band to generate a display of signal strength, such as energy or power (W), of signals received within the allocated frequency band. Furthermore, the spectrum analysis instructions may cause a processor to analyze signals before RF final amplification and after digital processing. It should be recognized that spectrum analysis instructions may analyze communication signals received by a communication antenna. Communication signals may be GSM, UHF, and WiFi/Bluetooth signals, for example. Communication antennas may be mounted in the single housing as described in U.S. application Ser. No. 12/871,705, which is herein incorporated by reference for all purposes. The display of signal power, or signal strength, within the frequency band allows for identification of in-band interference that may affect the calculation of position using GNSS signals.

The identification of in-band interference may be useful for many reasons. Identification of in-band interference may help a user decide to change the location of where he is taking a position measurement or to perform the position measurement at a different time to avoid the interference. The user, aware of the presence of in-band interference, may also choose to implement a desired in-band interference reduction technique to adjust the position measurements. Additionally, a user knowing there is in-band interference may understand why the GNSS device is taking longer to find a fixed RTK solution. The user will also be aware that the GNSS device is not malfunctioning and that the delay may be due to the in-band interference. By analyzing the spectrum within the GNSS device's signal processing system according to embodiments of the invention, the analysis of the spectrum is more related to the interference that is actually experienced by the GNSS device rather than a spectrum analysis generated by an external spectrum analyzer. Furthermore, by using the GNSS device's signal processing system to perform a spectrum analysis, interference generated internally by clocks in the GNSS device's system is able to be identified easily. Moreover, interference may be reduced by not analyzing the signals with an external probe as needed by an external spectrum analyzer.

FIG. 1 illustrates a typical configuration of a GNSS receiver according to embodiments disclosed herein. In some embodiments, a GNSS receiver may include receiving circuitry. In other embodiments, a GNSS receiver may include a portion of receiving circuitry. In one example, GNSS receiver 100 receives GNSS signals 102 from a GNSS antenna 101. GNSS signal 102 may contain two pseudo-noise ("PN") code components, a coarse code, and a precision code residing on orthogonal carrier components, which may be used by GNSS receiver 100 to determine the position of the GNSS receiver. For example, a typical GNSS signal 102 includes a carrier signal modulated by two PN code components. The frequency of the carrier signal may be satellite specific. Thus, each GNSS satellite may transmit a GNSS signal at a different frequency.

GNSS receiver 100 may also contain a low noise amplifier 104, a reference oscillator 128, a frequency synthesizer 130, a down converter 106, an automatic gain control (AGC) 109, and an analog-to-digital converter (ADC) 108. These components perform amplification, filtering, frequency down-conversion, and sampling. The reference oscillator 128 and frequency synthesizer 130 generate a frequency signal to down convert the GNSS signals 102 to baseband. It should be understood that the down converter 106 may convert the GNSS signals 102 to an intermediate frequency depending on the entire receiver frequency plan design and available electronic components. The ADC 108 then converts the GNSS signals 102 to a digital signal by sampling multiple repetitions of the GNSS signals 102.

The GNSS receiver 100 may also include multiple GNSS channels, such as channels 112 and 114. It should be understood that any number of channels may be provided. The GNSS channels 112 and 114 may each contain a demodulator to demodulate a GNSS PN code contained in ADC signal 109, a PN code reference generator, a numerically controlled oscillator (code NCO) to drive the PN code generator as well as a carrier frequency demodulator (e.g. a phase detector of a phase locked loop—PLL), and a numerically controlled oscillator to form a reference carrier frequency and phase (carrier NCO). In one example, the numerically controlled oscillator (code NCO) of channels 112 and 114 may receive code frequency/phase control signal 258 as input. Further, the numerically controlled oscillator (carrier NCO) of channels 112 and 114 may receive carrier frequency/phase control signal 259 as input. Code frequency/phase control signal 258 and carrier frequency/phase control signal 259 are described in greater detail below.

In one example, the processing circuitry for the GNSS channels may reside in an application specific integrated circuit ("ASIC") chip 110. When a corresponding frequency is detected, the appropriate GNSS channel may use the embedded PN code to determine the distance of the receiver from the satellite. This information may be provided by GNSS channels 112 and 114 through channel output vectors 113 and 115, respectively. Channel output vectors 113 and 115 each contain four signals forming two vectors—inphase I and quadriphase Q which are averaged signals of the phase loop discriminator (demodulator) output, and inphase dI and quadriphase dQ—averaged signals of the code loop discriminator (demodulator) output.

According to embodiments of the invention, a computing system 150 for generating a spectrum analysis is operably coupled to GNSS receiver 100. Spectrum analysis processor-executable instructions are stored in memory 140 of computing system 150. The spectrum analysis instructions, executable by CPU 208, are for scanning and identifying the shape and frequencies of interference. The computing system 150 may include one or more processors, such as a CPU 208. However, those skilled in the relevant art will also recognize how to implement the current technology using other computer systems or architectures. CPU 208 can be implemented using a general or special purpose processing engine such as, for example, a microprocessor, microcontroller or other control logic. In this example, CPU 208 is connected to a bus 142 or other communication medium.

The CPU 208 may be operably connected to microprocessor 132, via the bus 142, to receive the channel output vectors 113 and 115.

The spectrum analysis instructions stored in memory 140 are for generating an energy spectrum of one or more GNSS frequency bands. The memory 140 is integrated with GNSS receiver 100. Memory 140 may be read only memory ("ROM") or other static storage device coupled to bus 142 for storing static information and instructions for CPU 208. Memory 140 may also be random access memory (RAM) or other dynamic memory, for storing information and instructions to be executed by CPU 208. Memory 140 also may be used for storing temporary variables or other intermediate information during execution of instructions to be executed by CPU 208.

An information storage device 144 may be connected to GNSS receiver 100. The information storage device may include, for example, a media drive (not shown) and a removable storage interface (not shown). The media drive may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media may include, for example, a hard disk, floppy disk, magnetic tape, optical disk, CD or DVD, or other fixed or removable medium that is read by and written to by media drive. As these examples illustrate, the storage media may include a computer-readable storage medium having stored therein particular computer software or data.

In alternative embodiments, information storage device 144 may include other similar instrumentalities for allowing computer programs or other instructions or data to be loaded into computing system 150. Such instrumentalities may include, for example, a removable storage unit (not shown) and an interface (not shown), such as a program cartridge and cartridge interface, a removable memory (for example, a flash memory or other removable memory module) and memory slot, and other removable storage units and interfaces that allow software and data to be transferred from the removable storage unit to computing system 150.

Computing system 150 can also include a communications interface 146. Communications interface 146 can be used to allow software and data to be transferred between computing system 150 and external devices. Examples of communications interface 146 can include a modem, a network interface (such as an Ethernet or other NIC card), a communications port (such as for example, a USB port), a PCMCIA slot and card, etc. Software and data transferred via communications interface 146. Some examples of a communication interface 146 include a phone line, a cellular phone link, an RF link, a network interface, a local or wide area network, and other communications channels.

In this document, the terms "computer program product" and "computer-readable storage medium" may be used generally to refer to media such as, for example, memory 140, storage media, or removable storage unit. These and other forms of computer-readable media may be involved in providing one or more sequences of one or more instructions to CPU 208 for execution. Such instructions, generally referred to as "computer program code" (which may be grouped in the form of computer programs or other groupings), when executed, enable the computing system 150 to perform features or functions of embodiments of the current technology.

In an embodiment where the elements are implemented using software, the software may be stored in a computer-readable medium and loaded into computing system 150 using, for example, removable storage drive, media drive, or communications interface 146. The control logic (in this example, software instructions or computer program code), when executed by the CPU 208, causes the CPU 208 to perform the functions of the technology as described herein.

The signal strength data used for the energy spectrum may generated, for example, by calculating the square root of the sum of the squares of the I (in-phase) and Q (quadrature-phase) components of the GNSS signals received within the GNSS frequency band. More particularly, the numerically controlled oscillator (NCO) is adjusted to measure the signal strength, or energy, across the frequencies within the allocated GNSS band in steps. For example, measurements may be taken at every 10 kHz with a particular GNSS band. The I and Q components are then squared and summed. Energy may be calculated by taking the square root of that sum. A graphical representation of the signal strength data is provided to the user.

Further, according to embodiments of the invention, the spectrum analysis instructions may also include instructions for generating an indication of magnitude of the in-band interference for providing to the user. An indication of magnitude provided to the user allows the user to adjust the amplification needed for determining a position based on the received GNSS signals, for example. The indication of magnitude of the in-band interference may be generated in two different ways, for example. The first method of providing the indication of magnitude may be determined by examining the amplification of the analog GNSS signals during signal processing. The second method of providing the indication of magnitude may be by determining the satellite signal quality loss due to the in-band interference. Signal quality refers to, without limitation, signal-to-noise (S/N), carrier interference, and other signal quality metrics.

Figure 6:
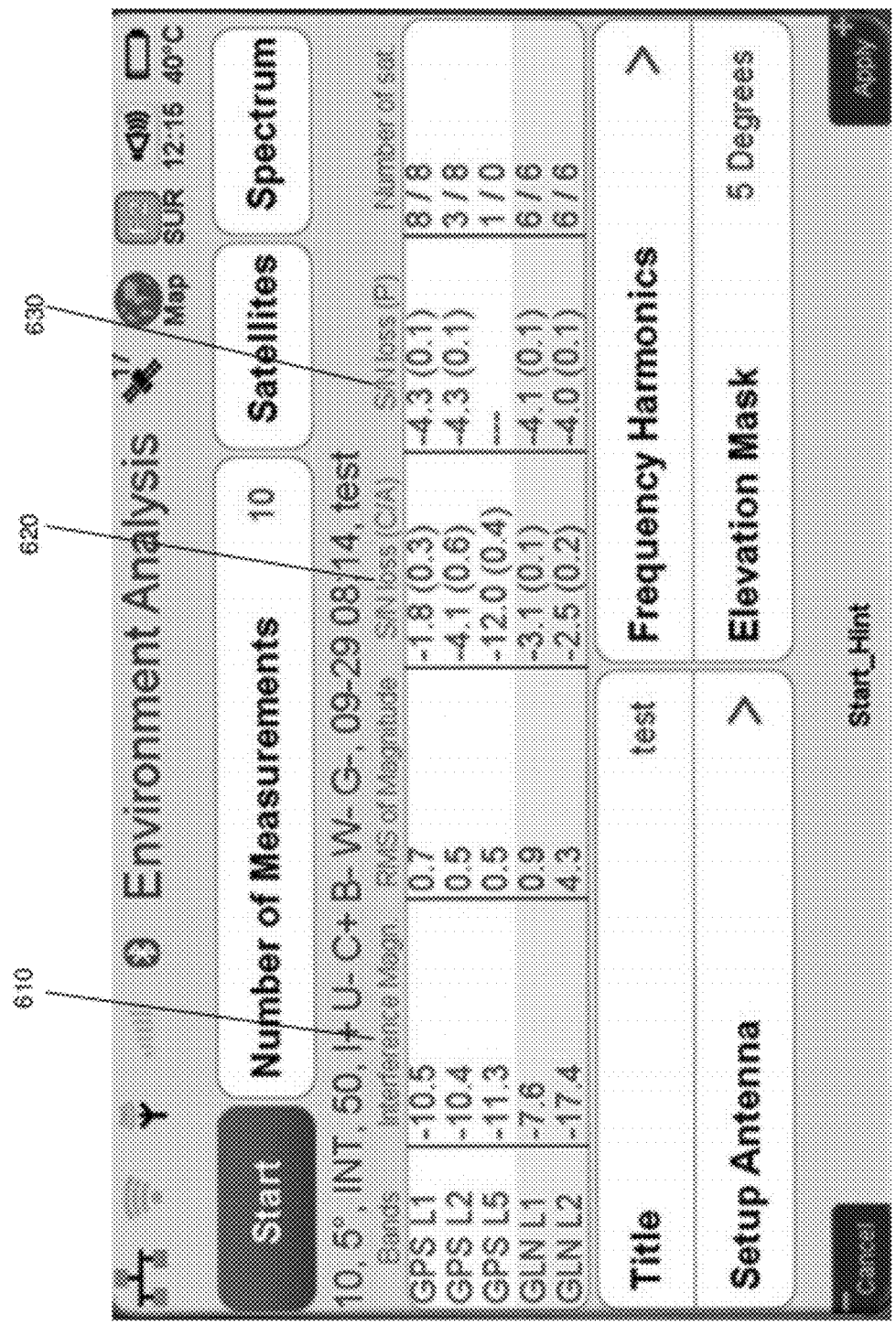
FIG. 6 illustrates an example of a graphical representation of interference measurements provided on a screen according to embodiments of the invention.
Figure 7:
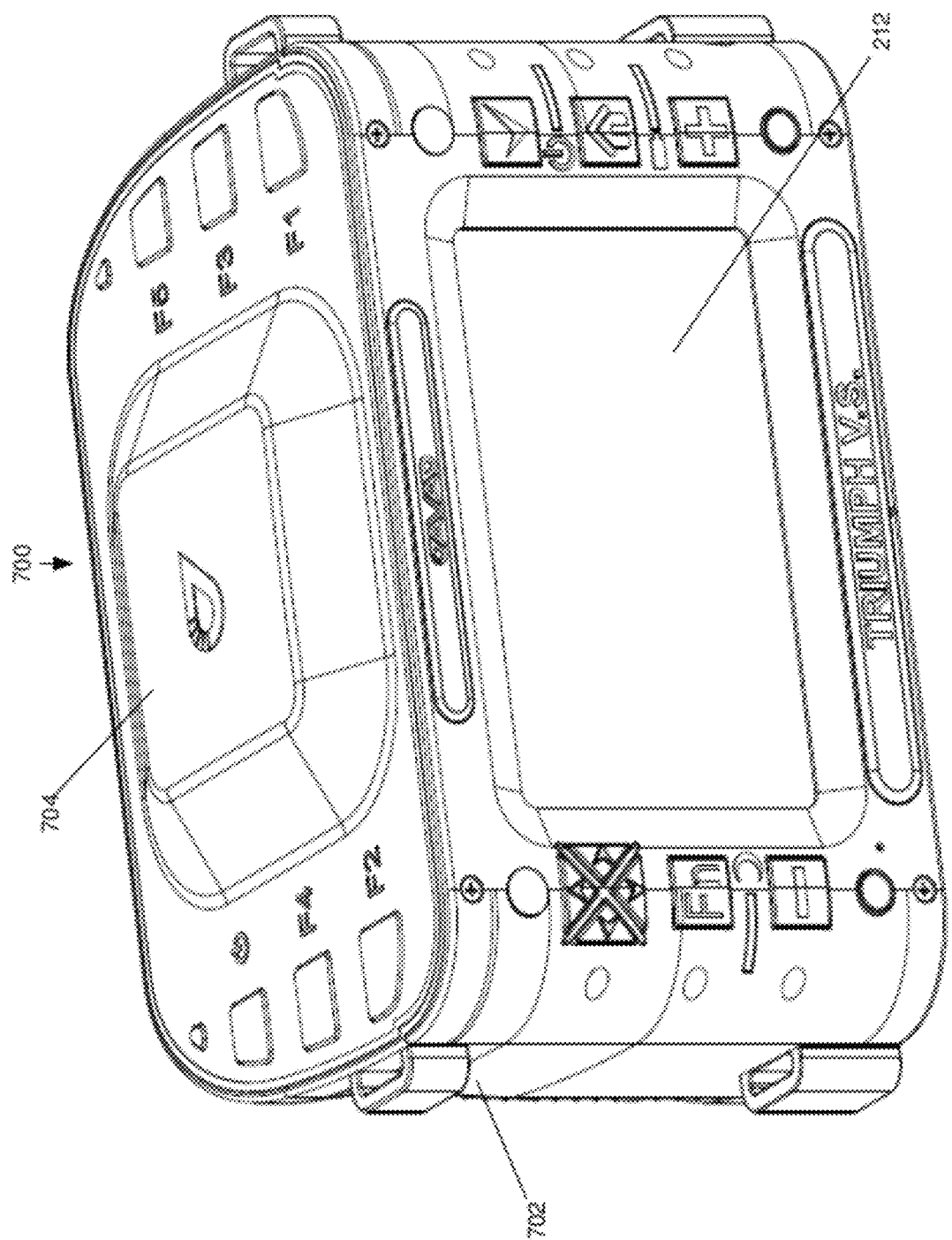
FIG. 7 illustrates a perspective view of a handheld GNSS device according to embodiments of the invention.

The first method for determining the indication of magnitude, according to embodiments of the invention, is based on analyzing the analog signal before amplification in the AGC 109 (FIG. 1). Thus, the indication of magnitude can be determined by comparing the actual amplification magnitude of the AGC 109 with the nominal amplification magnitude (when no interference exists). As mentioned above, having an indication of magnitude of the in-band interference will allow a user to adjust the amplification of the GNSS signals to avoid saturation. In other words, it will allow a user to use a minimum amount of amplification to avoid saturation of a signal. The indication of magnitude of the in-band interference can be displayed to the user on display 212 of the GNSS handheld unit 700 (FIG. 7). An example of the graphic that may be displayed to the user to provide the indication of magnitude is illustrated in FIG. 6 in column 610.

A second method for determining an indication of magnitude of the in-band interference is determining a signal quality loss due to the in-band interference by analyzing signal quality ratio of the GNSS signals after the GNSS signals are digitized and processed (code and carrier correlations). A signal quality metric refers to, without limitation, signal-to-noise (S/N), carrier interference, and other signal quality metrics. Satellite S/N loss may be determined by comparing the actual measured S/N of each signal of each satellite with the nominal S/N at the particular elevation angle where the measurement is taken by the GNSS handheld device. The deviations between the actual measured S/N and the nominal S/N at the particular elevation angle for the satellites are averaged and provided to the user on display 212. Nominal S/N for particular elevation angles are known and stored in memory 140. The S/N for a C/A-code is depicted in column 620 and the S/N for the P-code is depicted in column 630 of FIG. 6 for an elevation angle of 5°.

As such, the energy is plotted for each frequency step within the desired GNSS frequency band and provided to the display 212 for visualization. Furthermore, an indication of magnitude may also be provided on the graphical representation of the energy plot.

Figure 2:
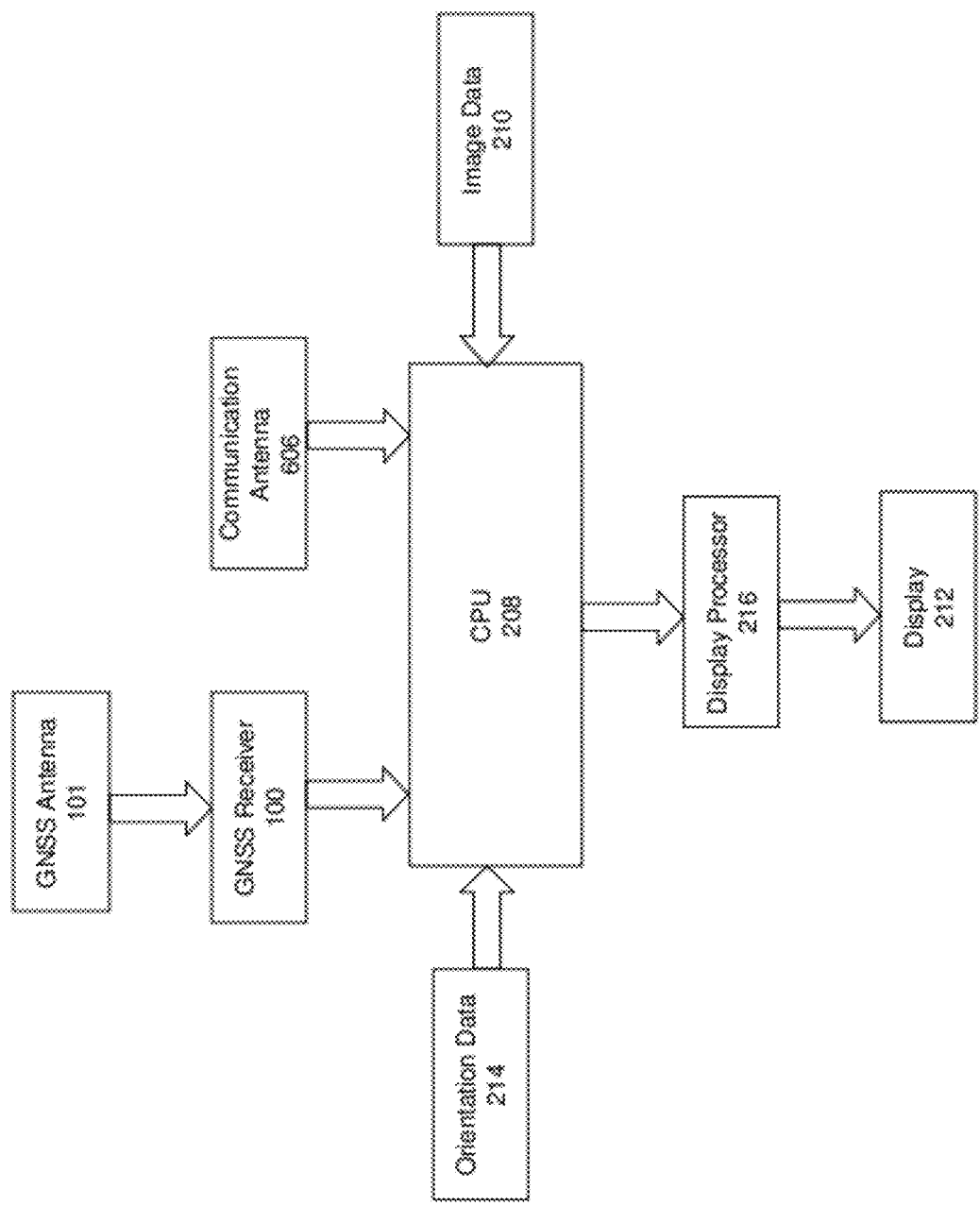
FIG. 2 illustrates a logic diagram showing the relationships between the various components of a handheld GNSS device according to embodiments of the invention.

In this way, the signal strength data generated by the CPU 208 executing the instructions stored in memory 140 will indicate any-band interference within one or multiple GNSS frequency bands. Because the down-conversion applied to the incoming RF signals is known, the frequency axis of the spectrum display can be calibrated using known techniques to indicate the baseband RF frequencies even though the actual signal analyzed by the CPU 208 is a down-converted version of the baseband signal. The signal strength data determined by CPU 208 may be provided to a display processor 216 (FIG. 2) for generating a spectrum display on a display screen. FIG. 2 illustrates an exemplary logic diagram showing the relationships between the various component, described below, of handheld GNSS device 700 (shown in FIG. 7).

In other embodiments, the signal strength data may be provided to a display screen from CPU 208. By knowing the in-band interference, known interference rejection/reduction methods may be implemented to filter out the interference. Interference rejection/reduction methods may be also implemented by CPU 208.

Various embodiments are described below relating to the handheld GNSS device. The handheld GNSS device may include various sensors, such as a camera, distance sensor, and horizon sensors. A display element may also be included for assisting a user to position the device without the aid of external positioning equipment (e.g., a tripod or pole).

As mentioned above, FIG. 2 illustrates an exemplary logic diagram showing the relationships between the various components of handheld GNSS device 700 (shown in FIG. 7). In one example, GNSS antenna 101 may send position data received from GNSS satellites to GNSS receiver 100. GNSS receiver 100 may convert the received GNSS satellite signals into Earth-based coordinates, such as WGS84, ECEF, ENU, and the like. GNSS receiver 100 may further send the coordinates to CPU 208 for processing along with position assistance data received from communication antenna 606. Orientation data 214 from orientation sensors within the GNSS handheld device 700 may also be sent to CPU 208. Orientation data 214 may include pitch and roll data from orientation sensors such as pitch horizon sensors and roll horizon sensors, for example. Image data 210 from video or still camera may also be sent along to the CPU 208 with the position data received by the GNSS antenna 101, positioning assistance data received by communication antenna 606, and orientation data 214. CPU 208 processes the data to determine the position of the point of interest marker and provides the position data to the display processor 216. The display processor 216 provides display data to be displayed on display 212. Further, CPU 208 processes the signal strength data of a GNSS frequency band and provides the signal strength data to display processor 216 for displaying on display 212. A user looking at the display of the signal strength data on display 212 may identify current in-band interference. The CPU 208 identifies the in-band interference based upon known techniques, such as setting a threshold relative to expected signal strength of a GNSS signal.

Figure 3:
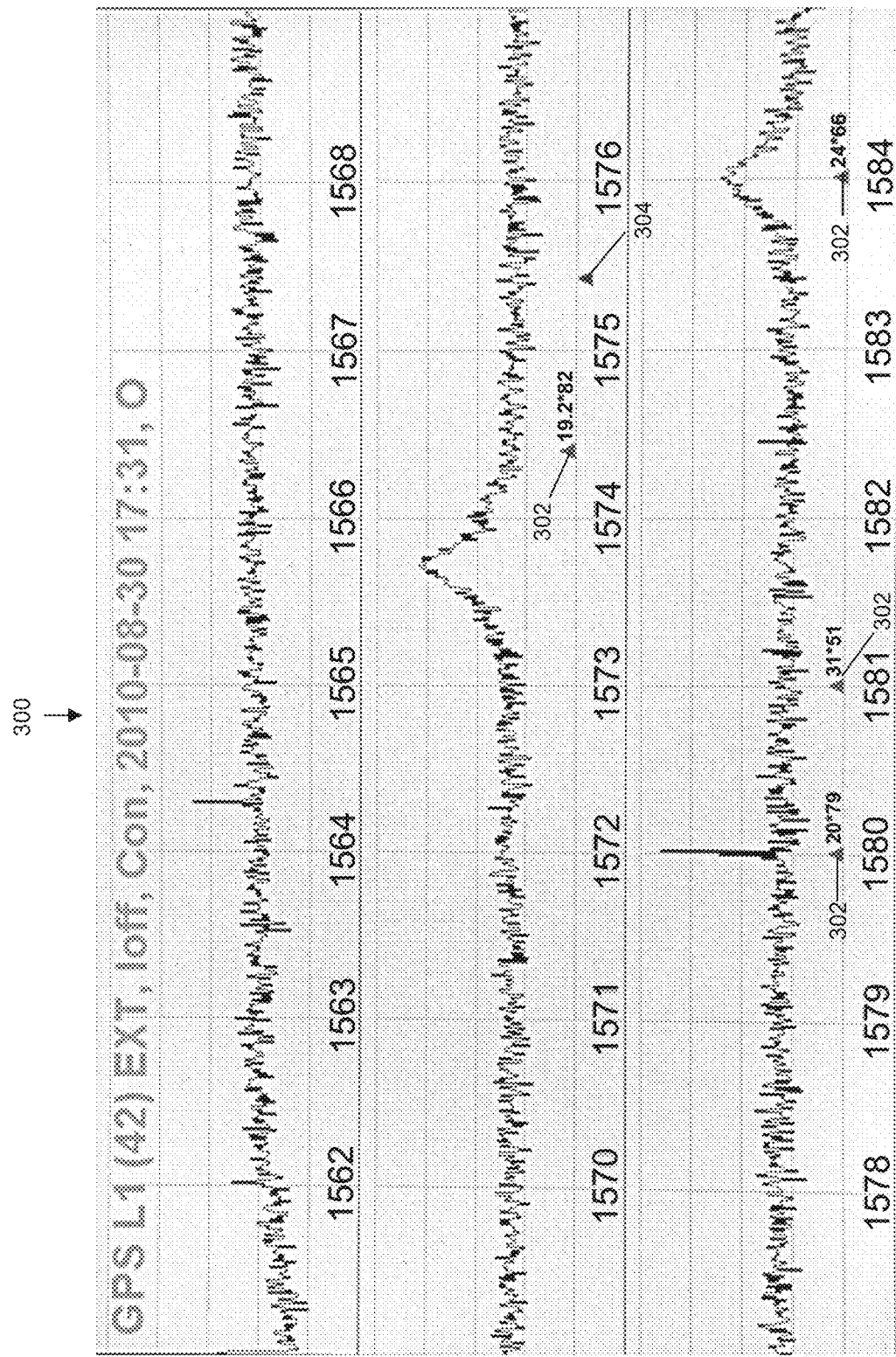
FIG. 3 illustrates an example of a graphical representation of a GPS frequency spectrum for display on a screen according to embodiments of the invention.
Figure 4:
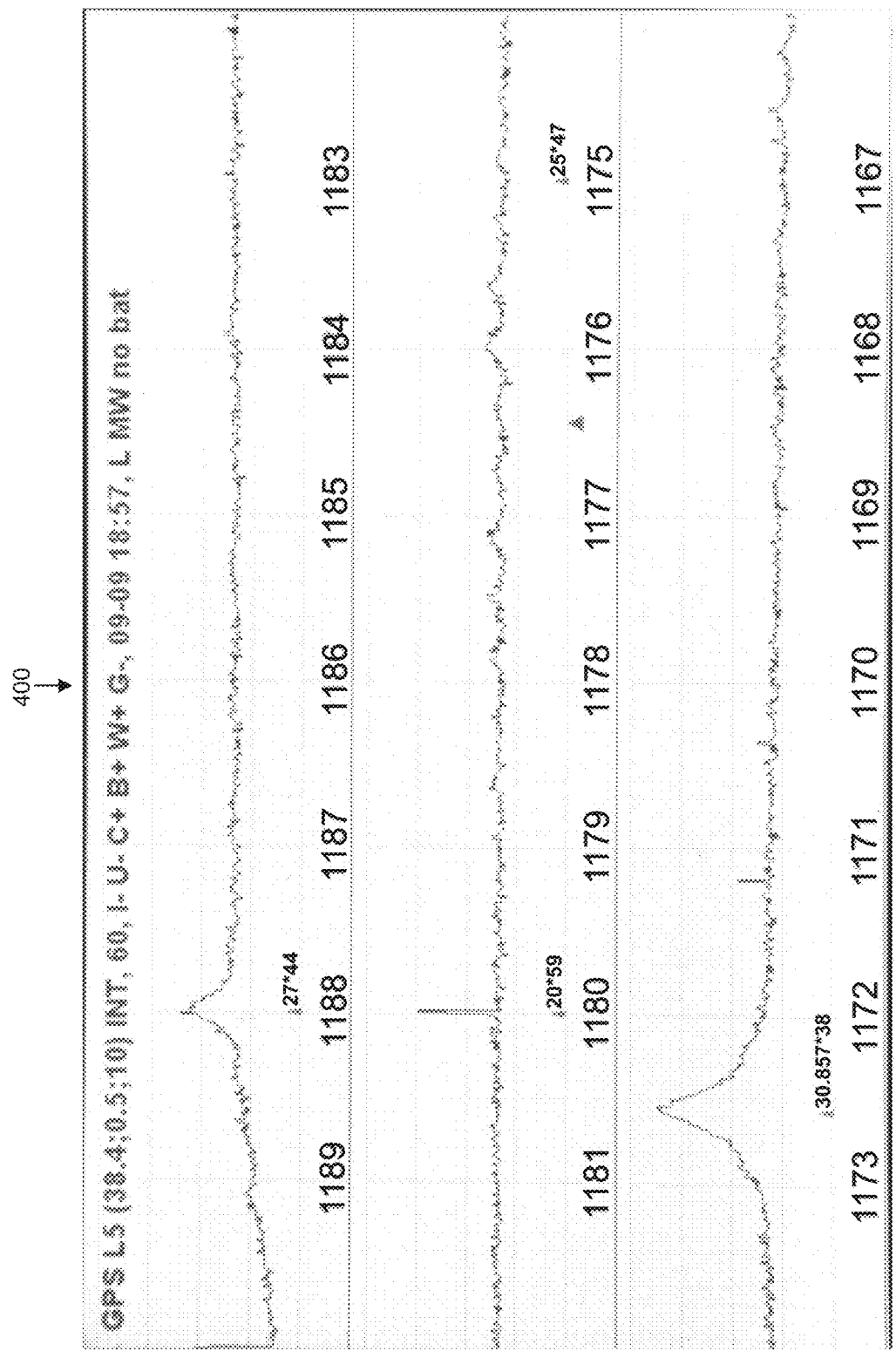
FIG. 4 illustrates another example of a graphical representation of a GPS frequency spectrum for display on a screen according to embodiments of the invention.
Figure 5:
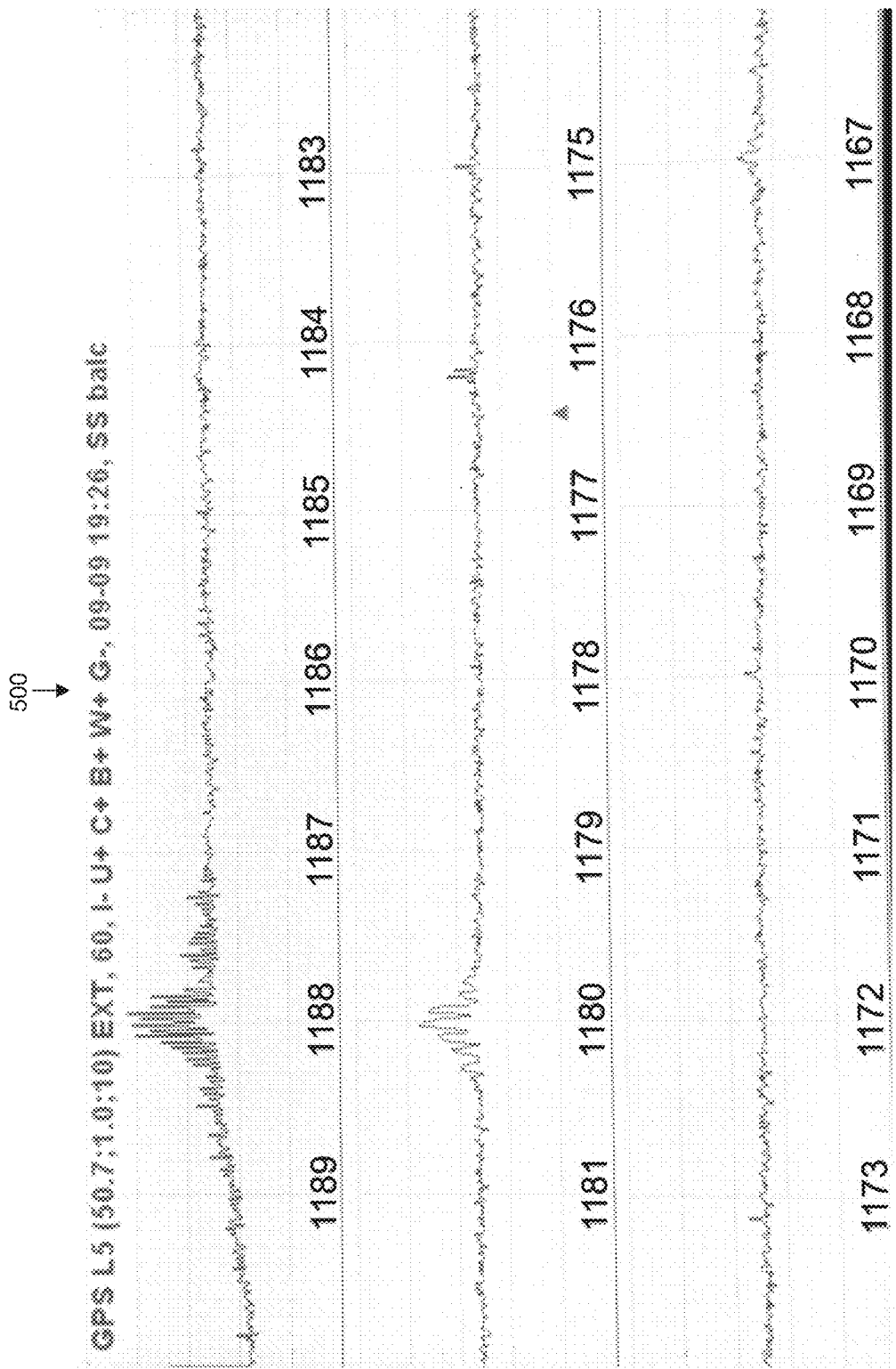
FIG. 5 illustrates another example of a graphical representation of a GPS frequency spectrum for display on a screen according to embodiments of the invention.

An example of the graphical representation of the signal strength data 300 that may be displayed on display 212 is illustrated in FIG. 3, FIG. 4, and FIG. 5. The example in FIG. 3 displays an allocated GPS frequency band, GPS L1. A processor executing spectrum analysis instructions stored in memory 140 may also scan other GPS frequency bands, such as GPS L2, GPS L5, or other GNSS bands such as the GLONASS bands. Furthermore, the processor executing spectrum analysis instructions stored in memory 140 may also scan communication bands, such as GSM, UHF, and WiFi/Bluetooth. It should be recognized that the energy spectrum of a portion of any one GNSS frequency band, an entire GNSS frequency band, or multiple GNSS frequency bands may be scanned and displayed. The graphical representation 300 may include indicators 302 showing where in the spectrum in-band interference has been detected. Furthermore, the graphical representation 300 may include an indicator 304 illustrating the center of the GNSS frequency band. The graphical representation 300 displayed on display 212 allows a user to visualize any in-band interference in the vicinity.

FIG. 7 illustrates an exemplary handheld GNSS device 700. Handheld GNSS device 700 utilizes a single housing 702. An exemplary configuration of a handheld GNSS device is described in U.S. patent application Ser. No. 12/871,705 filed Aug. 30, 2010, assigned to the assignee of the present invention, which is incorporated herein by reference in its entirety for all purposes. Several GNSS elements are integral to the housing 102 in that they are within the housing or securely mounted thereto. A securely mounted element may be removable. Housing 702 allows the user to hold the handheld GNSS device 700 similar to the way one would hold a typical camera. In one example, the housing 702 may include GNSS antenna cover 704 to cover a GNSS antenna 101 (shown in FIG. 9) which may receive signals transmitted by a plurality of GNSS satellites and used by handheld GNSS device 100 to determine position. The GNSS antenna 101 is integral with the housing 702 in that it resides in the housing 702 under the GNSS antenna cover 704.

In one example, GNSS antenna 101 may receive signals transmitted by at least four GNSS satellites. In the example shown by FIG. 7, GNSS antenna cover 704 is located on the top side of handheld GNSS device 700.

As shown in FIG. 7, handheld GNSS device 700 may further include display 212 for displaying information to assist the user in positioning the device. Display 212 may be any electronic display such as a liquid crystal (LCD) display, light emitting diode (LED) display, and the like. Such display devices are well-known by those of ordinary skill in the art and any such device may be used. In the example shown by FIG. 7, display 212 is integral with the back side of the housing 702 of handheld GNSS device 700.

Additionally, the housing 702 may further include communication antennas for receiving differential correction data from a fixed or mobile base transceiver, as described in U.S. patent application Ser. No. 12/360,808, assigned to the assignee of the present invention, and incorporated herein by reference in its entirety for all purposes. Differential correction data may include, for example, the difference between measured satellite pseudo-ranges and actual pseudo-ranges. This correction data received from a base station may help to eliminate errors in the GNSS data received from the satellites. Alternatively, or in addition, the communication antenna may receive raw range data from a moving base transceiver. Raw positioning data received by the communication antenna may be, for example, coordinates of the base and other raw data, such as the carrier phase of a satellite signal received at the base transceiver and the pseudo-range of the satellite to the base transceiver.

Figure 8:
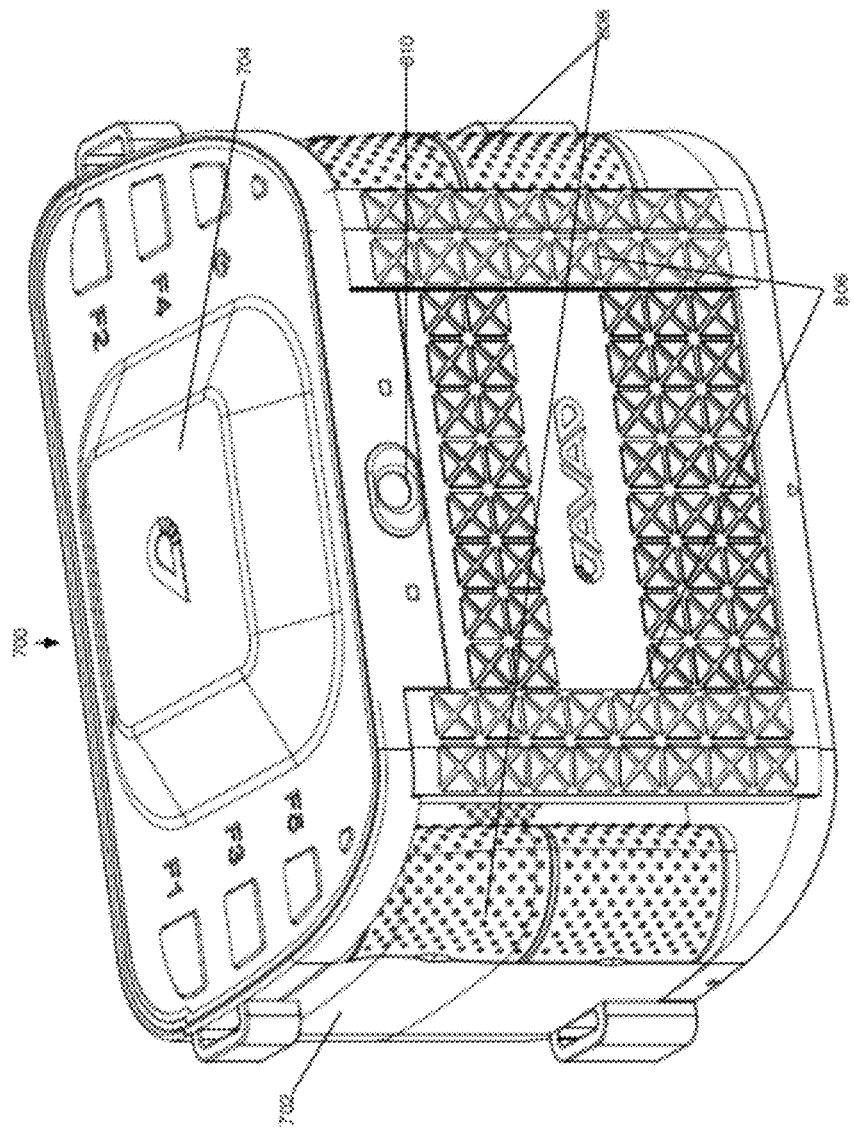
FIG. 8 illustrates another perspective view of a handheld GNSS device according to embodiments of the invention.

The communication antenna is configured such that its antenna pattern is substantially separated from the antenna pattern of the GNSS antenna such that there is minimal or nearly minimal mutual interference between the antennas. As used herein, "substantial" separation may be achieved by positioning the communication antenna below the main ground plane of the GNSS antenna, as shown in FIG. 8. According to embodiments of the invention, a substantial separation attenuates interference between the communication antenna and the GNSS antenna by as much as 40 dB. Furthermore, the communication antenna and the GNSS antenna are positioned such that the body of the user holding the GNSS device does not substantially interfere with the GNSS signal.

Moreover, as mentioned above, to properly measure the position of a given point using a GNSS-based device, the GNSS antenna must be precisely positioned so that the position of the point of interest may be accurately determined. To position a GNSS device in such a manner, external hardware, such as a tripod, is commonly used. Such hardware is bulky and difficult to carry. Thus, according to embodiments of the invention, compact positioning tools, included in the single unit housing, are useful for a portable handheld GNSS device.

As shown in FIG. 8, handheld GNSS device 7800 further includes covers for communication antennas 806 integral with the housing 702. In embodiments of the invention there may be three such communication antennas, including GSM, UHF, and WiFi/Bluetooth antennas enclosed beneath covers for the communication antennas 806.

Figure 9:
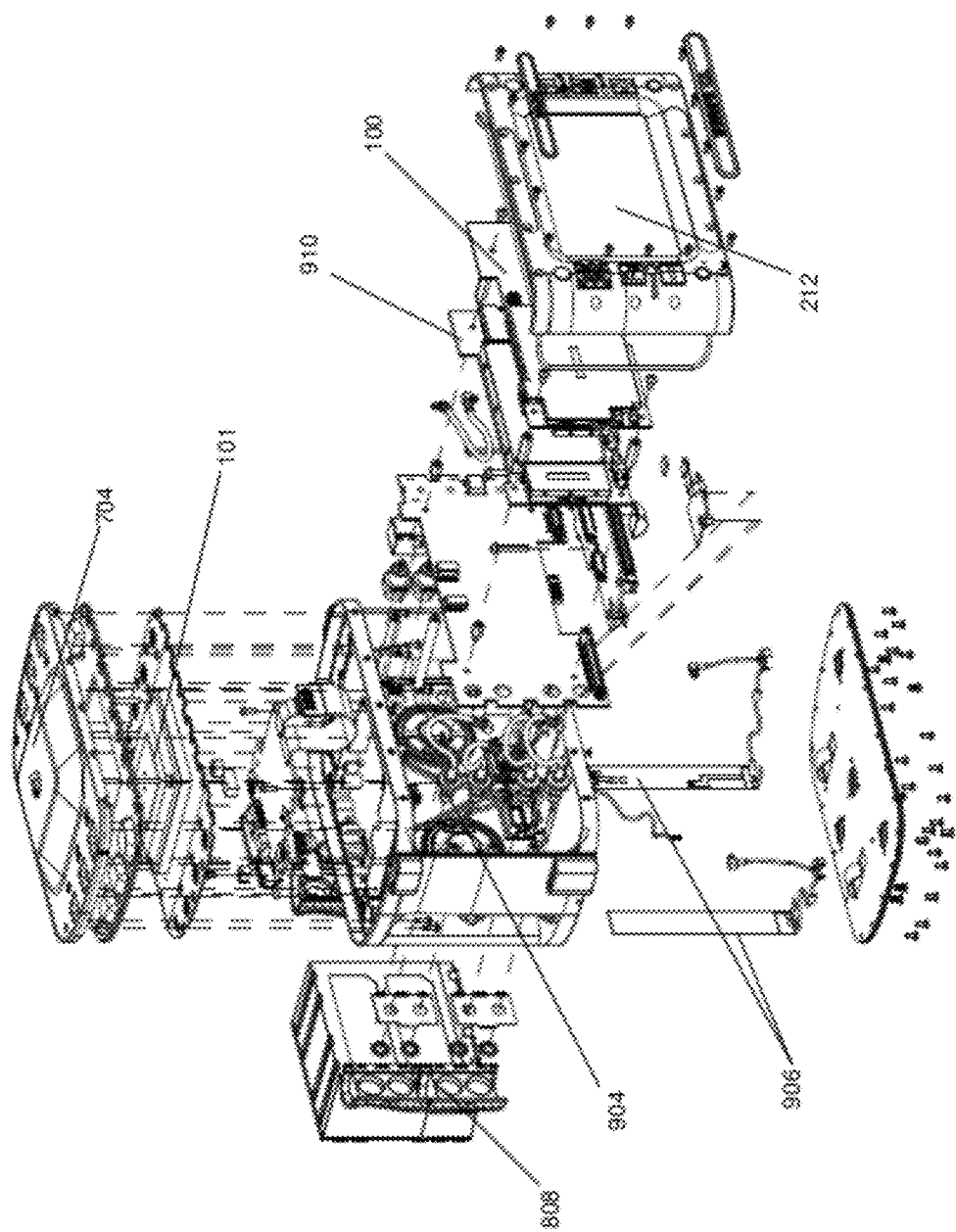
FIG. 9 illustrates an exploded view of a handheld GNSS according to embodiments of the invention.

An exemplary exploded view of handheld GNSS device 700 is shown in FIG. 9. Communication antennas 906 are positioned beneath the covers 806 (FIG. 8). The GSM and UHF antennas may be only one-way communication antennas. In other words, the GSM and UHF antenna may only be used to receive signals, but not transmit signals. The WiFi antenna may allow two-way communication. The communication antennas 906 receive positioning assistance data, such as differential correction data or raw positioning data from base transceivers.

In the example shown in FIG. 8, the GNSS antenna cover 404 is located on the top of the housing 702. In the same example of FIG. 8, the communication antenna covers 806 are located on the front of the housing 502.

Handheld GNSS device 700 may further include at least one handgrip 808. In the example shown in FIG. 8, two handgrips 808 are integral to the housing 702. The handgrips 108 may be covered with a rubber material for comfort and to reduce slippage of a user's hands.

The handgrips 808, in certain embodiments, may also be positioned to be near to the communication antenna covers 806. Handgrips 808 are shown in a position that, when a user is gripping the handgrips 808, the user minimally interferes with the antenna patterns of GNSS antenna 101 and communication antennas 906. For example, the user's hands do not cause more than −40 dB of interference while gripping the handgrips 808 in this configuration, e.g., with the handgrips 808 behind and off to the side of the communication antenna covers 806.

Handheld GNSS device 700 may further include a camera for recording still images or video. Such recording devices are well-known by those of ordinary skill in the art and any such device may be used. In the example illustrated in FIG. 8, front camera lens 810 is located on the front side of handheld GNSS device 700. A more detailed description of the positioning of front camera lens 810 is provided in U.S. patent application Ser. No. 12/571,244, filed Sep. 30, 2009, assigned to the assignee of the present invention, which is incorporated herein by reference in its entirety for all purposes. In one example, display 212 may be used to display the output of front camera lens 810.

Handheld GNSS device 700 may also include a second bottom camera lens (not shown) on the bottom of handheld GNSS device 700 for viewing and alignment of the handheld GNSS device 700 with a point of interest marker. The image of the point of interest marker may also be recorded along with the GNSS data to ensure that the GNSS receiver 100 was mounted correctly, or compensate for misalignment later based on the recorded camera information.

Handheld GNSS device 700 may further include horizon sensors (not shown) for determining the orientation of the device. The horizon sensors may be any type of horizon sensor, such as an inclinometer, accelerometer, and the like. Such horizon sensors are well-known by those of ordinary skill in the art and any such device may be used. The horizon sensor information can be recorded along with GNSS data to later compensate for mis-leveling of the antenna.

Handheld GNSS device 700 may further include a distance sensor (not shown) to measure a linear distance. The distance sensor may use any range-finding technology, such as sonar, laser, radar, and the like. Such distance sensors are well-known by those of ordinary skill in the art and any such device may be used. Examples of methods for estimating a distance to a point of interest can be estimated as described in U.S. patent application Ser. No. 12/571,244 filed on Sep. 30, 2009, assigned to the assignee of the present invention, which is incorporated herein by reference for all purposes.

FIG. 9 illustrates an exploded view of the handheld GNSS device 700. When assembled, GNSS antenna 101 is covered by the GNSS antenna cover 104, and the communication antennas 906 are covered by the communication antenna covers 806.

It will be appreciated that, for clarity purposes, the above description has described embodiments with reference to different functional units and processors. However, it will be apparent that any suitable distribution of functionality between different functional units, processors, or domains may be used. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Furthermore, although individually listed, a plurality of means, elements, or method steps may be implemented by, for example, a single unit or processor. Additionally, although individual features may be included in different claims, these may possibly be advantageously combined, and the inclusion in different claims does not imply that a combination of features is not feasible or advantageous. Also, the inclusion of a feature in one category of claims does not imply a limitation to this category, but rather the feature may be equally applicable to other claim categories, as appropriate.

Although a feature may appear to be described in connection with a particular embodiment, one skilled in the art would recognize that various features of the described embodiments may be combined. Moreover, aspects described in connection with an embodiment may stand alone.

What is claimed is:

1. A handheld GNSS device for location information determining signal strength data within an allocated GNSS frequency band, the handheld GNSS device comprising:
   a GNSS antenna mounted on the handheld GNSS device for receiving a first received signal within the allocated GNSS frequency band and a second received signal within the allocated GNSS frequency band;
   receiving circuitry coupled to the GNSS antenna for demodulating the first received signal into a demodulated signal, wherein the demodulated signal includes data from at least four GNSS satellites;
   a processor coupled to the receiving circuitry;
   a display screen coupled to the processor; and
   memory coupled to the processor for storing instructions executable by the processor, the instructions including instructions for:
   generating signal strength data for the first received signal within the allocated GNSS frequency band;
   determining an indication of magnitude of interference associated with each of a plurality of frequencies within the allocated GNSS frequency band;
   identifying at least one of the plurality of frequencies having an associated indication of magnitude greater than an interference threshold value;
   causing the display screen to display a graphical representation of the signal strength data for at least a portion of the allocated GNSS frequency band;
   causing the display of at least one indicator overlaid on the graphical representation that identifies the at least one of the plurality of frequencies having the associated indication of magnitude greater than the interference threshold value within at least the displayed portion of the allocated GNSS frequency band;
   implementing an in-band interference reduction technique for the at least one of the plurality of frequencies identified by the at least one indicator; and
   determining a position for a point of interest based upon the second received signal and the in-band interference reduction technique.

2. The handheld GNSS device of claim 1, wherein generating signal strength data for the first received signal is based on the demodulated signal.

3. The handheld GNSS device of claim 1, wherein the instructions for generating signal strength data for the first received signal include instructions for calculating a square root of a sum of $I^2$ (in-phase) and $Q^2$ (quadrature-phase) components of the first received signal to determine an amplitude component of the signal strength data.

4. The handheld GNSS device of claim 1, wherein the receiving circuitry includes an automatic gain control (AGC), and wherein the instructions for determining the indication of magnitude include instructions for comparing an amplification magnitude of the AGC with a nominal amplification magnitude.

5. The handheld GNSS device of claim 1, wherein the instructions for determining the indication of magnitude include instructions for:
   determining a signal quality metric of the first received signal,
   determining a nominal signal quality metric at an elevation angle at a location of the device, and
   comparing the signal quality metric of the first received signal to the nominal signal quality metric.

6. The handheld GNSS device of claim 5, wherein the signal quality metric is a signal-to-noise ratio (S/N).

7. The handheld GNSS device of claim 1, further comprising a housing, wherein the GNSS antenna and the display screen are integral with the housing, and the receiving circuitry, the processor, and the memory are within the housing.

8. The handheld GNSS device of claim 7, further comprising:
orientation circuitry, within the housing, for generating orientation data of the housing based upon a position of the housing related to the horizon; and
imaging circuitry, within the housing, for obtaining image data concerning the point of interest for display on the display screen, wherein the processor is coupled to the receiving circuitry, the imaging circuitry, and the orientation circuitry, and wherein determining the position for the point of interest is further based upon the orientation data and the image data.

9. The handheld GNSS device of claim 8, further comprising:
at least one communication antenna, integral with the housing for receiving, from a base station, positioning assistance data related to the first received signal, wherein the GNSS antenna has a first pattern and the at least one communication antenna has a second pattern, and the GNSS antenna and the at least one communication antenna are configured such that the first and second patterns are substantially separated, and
wherein the processor determines the position for the point of interest based on at least the demodulated signal, the orientation data, the image data, and the positioning assistance data.

10. The handheld GNSS device of claim 9, wherein the at least one communication antenna is an antenna selected from a group consisting of: a GSM antenna, a UHF antenna, and a WiFi/Bluetooth antenna.

11. The handheld GNSS device of claim 9, wherein the at least one communication antenna comprises three communication antennas.

12. The handheld GNSS device of claim 9, wherein the positioning assistance data includes correction data for compensating for errors in the first received signal in determining the position of the point of interest.

13. The handheld GNSS device of claim 8, wherein the image data includes at least one image, and the at least one image represents a view of the point of interest viewed from the device.

14. The handheld GNSS device of claim 8, wherein the orientation data represents an orientation of the device with respect to a plane parallel with a horizon.

15. A computer-implemented method for determining signal strength data and position data at a handheld GNSS device configured to receive at a GNSS antenna a first received signal and a second received signal at a frequency within an allocated GNSS frequency band, the computer-implemented method comprising:
generating signal strength data, by a processor, for the first received signal within the allocated GNSS frequency band;
determining, by the processor, an indication of magnitude of interference associated with each of a plurality of frequencies within the allocated GNSS frequency band;
identifying, by the processor, at least one of the plurality of frequencies having an associated indication of magnitude greater than an interference threshold value;
displaying, on a display screen, a graphical representation of the signal strength data for at least a portion of the allocated GNSS frequency band;
causing the display of at least one indicator overlaid on the graphical representation that identifies the at least one of the plurality of frequencies having the associated indication of magnitude greater than the interference threshold value within the at least the portion of the allocated GNSS frequency band;
implementing an in-band interference reduction technique for the at least one of the plurality of frequencies identified by the at least one indicator; and
determining a position for a point of interest, by the processor, based upon the second received signal and the in-band interference reduction technique.

16. The computer-implemented method of claim 15, wherein generating signal strength data is based upon a demodulated signal.

17. The computer-implemented method of claim 15, wherein generating signal strength data includes calculating a square root of a sum of $I^2$ (in-phase) and $Q^2$ (quadrature-phase) components of the first received signal to determine an amplitude component of the signal strength data.

18. The computer-implemented method of claim 15, wherein the method further includes amplifying the first received signal using an automatic gain control (AGC), and wherein determining the indication of magnitude includes comparing an amplification magnitude of the AGC with a nominal amplification magnitude.

19. The computer-implemented method of claim 15, wherein determining the indication of magnitude includes:
determining a signal quality metric of the first received signal,
determining a nominal signal quality metric at an elevation angle at a location where the first received signal was received, and
comparing the signal quality metric of the first received signal to the nominal signal quality metric.

20. The computer-implemented method of claim 19, wherein the signal quality metric is a signal-to-noise ratio (S/N).

21. A non-transitory computer-readable medium encoded with executable instructions for determining signal strength data and position data at a handheld GNSS device configured to receive at a GNSS antenna a first received signal and a second received signal at a frequency within an allocated GNSS frequency band, the instructions comprising instructions for:
generating signal strength data, by a processor, for the first received signal within the allocated GNSS frequency band;
determining, by the processor, an indication of magnitude of interference associated with each of a plurality of frequencies within the allocated GNSS frequency band;
identifying, by the processor, at least one of the plurality of frequencies having an associated indication of magnitude greater than an interference threshold value;
displaying, on a display screen, a graphical representation of the signal strength data for at least a portion of the allocated GNSS frequency band;
causing the display of at least one indicator overlaid on the graphical representation that identifies the at least one of the plurality of frequencies having the associated indication of magnitude greater than the interference threshold value within the at least the portion of the allocated GNSS frequency band;
implementing an in-band interference reduction technique for the at least one of the plurality of frequencies identified by the at least one indicator; and determining a position for a point of interest, by the processor, based upon the second received signal and the in-band interference reduction technique.

22. The computer-readable medium of claim 21, wherein generating signal strength data is based upon a demodulated signal.

23. The computer-readable medium of claim 21, wherein the instructions for generating signal strength data include instructions for calculating a square root of a sum of $I^2$ (in-phase) and $Q^2$ (quadrature-phase) components of the first received signal to determine an amplitude component of the signal strength data.

24. The computer-readable medium of claim 21, wherein the first received signal is amplified using an automatic gain control (AGC), and wherein the instructions for determining the indication of magnitude include instructions for comparing an amplification magnitude of the AGC with a nominal amplification magnitude.

25. The computer-readable medium of claim 21, wherein the instructions for determining the indication of magnitude include instructions for:

determining a signal quality metric of the first received signal, determining a nominal signal quality metric at an elevation angle at a location where the first received signal was received, and comparing the signal quality metric of the first received signal to the nominal signal quality metric.

26. The computer-readable medium of claim 25, wherein the signal quality metric is a signal-to-noise ratio (S/N).

* * * * *